United States Patent
Watanabe et al.

[11] Patent Number: 5,996,899
[45] Date of Patent: *Dec. 7, 1999

[54] THERMOSTATIC EXPANSION VALVE

[75] Inventors: Kazuhiko Watanabe, Tokyo; Chiharu Watanabe, Aichi, both of Japan

[73] Assignee: Fujikoki Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,070

[22] Filed: Aug. 14, 1997

Related U.S. Application Data

[63] Continuation of application No. 08/570,011, Dec. 14, 1995, abandoned.

[30] Foreign Application Priority Data

Dec. 22, 1994 [JP] Japan ................................. 6-320742
Jun. 30, 1995 [JP] Japan ................................. 7-166001

[51] Int. Cl.$^6$ ................................................... F25B 41/04
[52] U.S. Cl. .......................................... 236/92 B; 62/225
[58] Field of Search ........................... 62/225; 236/92 B; 156/280

[56] References Cited

U.S. PATENT DOCUMENTS

| | | | |
|---|---|---|---|
| 4,143,790 | 3/1979 | Ueno et al. ............................. | 220/458 |
| 4,384,657 | 5/1983 | Ueno et al. ............................. | 220/458 |
| 4,499,136 | 2/1985 | Nakamura et al. ...................... | 428/206 |
| 4,735,835 | 4/1988 | Taira et al. ............................. | 428/35 |
| 4,935,080 | 6/1990 | Hassell et al. .......................... | 156/154 |
| 5,072,605 | 12/1991 | Imazu et al. ............................ | 72/46 |
| 5,228,588 | 7/1993 | Aizawa et al. .......................... | 220/458 |
| 5,249,447 | 10/1993 | Aizawa et al. .......................... | 72/46 |
| 5,303,864 | 4/1994 | Hirota ................................... | 236/92 B |

FOREIGN PATENT DOCUMENTS

| | | |
|---|---|---|
| 0718569A1 | 6/1996 | European Pat. Off. . |
| 2-254270 | 10/1990 | Japan . |
| 930725 | 7/1963 | United Kingdom . |

*Primary Examiner*—William E. Tapolcal
*Attorney, Agent, or Firm*—Foley & Lardner

[57] ABSTRACT

A thermostatic expansion valve has a valve shell, e.g., housing, with a high-pressure refrigerant passage and a low-pressure refrigerant passage. The high pressure refrigerant passage has a valve hole and a valve member that changes the valve hole opening rate. A pressure-operating chamber, which has an air-tight chamber and an equalizing chamber separated by a diaphragm, drives the valve member. This pressure-operating chamber, which is attached to the valve shell to detect the temperature, detects the temperature of gaseous phase refrigerant. The valve shell has a hole or opening extending through its outer wall. A plug member seals the hole after a heat-sensitive gas, which senses the temperature of the gas-phase refrigerant passing through the expansion valve, is introduced into the housing through the opening. The plug member is seated on the peripheral edge of the opening and welded to the opening peripheral edge by projection welding. An anti-corrosive material is applied to cover the welded area.

4 Claims, 2 Drawing Sheets

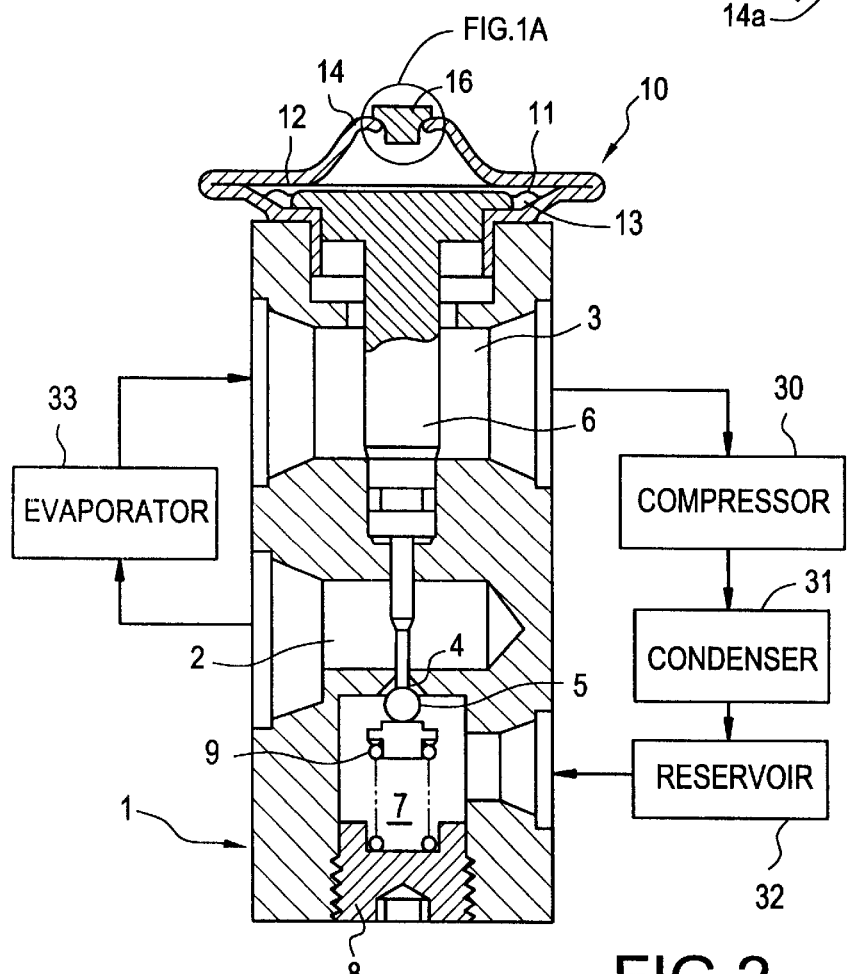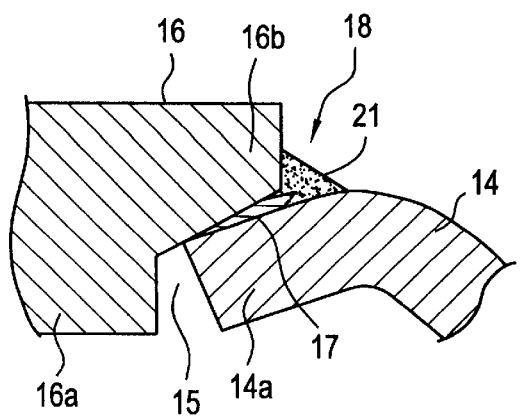

THERMOSTATIC EXPANSION VALVE

This application is a continuation of application Ser. No. 08/570,011 filed Dec. 14, 1995 now abandoned.

BACKGROUND OF THE INVENTION

1. Field of the Invention

This invention relates to a thermostatic expansion valve for use in refrigerating systems of car air conditioners.

2. Description of Related Art

As shown in Japanese Laid-open Patent No. 6-185833, a conventional thermostatic expansion valve generally comprises a valve shell that has a high-pressure refrigerant passage through which liquid refrigerant to be reduced in pressure travels and a low-pressure refrigerant passage through which vapor-phase refrigerant travels. A valve hole is formed midway of the high-pressure refrigerant passage. A valve member is disposed to move to and away from the valve hole to change the opening rate of the valve hole. A pressure-operating housing includes a diaphragm for driving the valve member through a driving rod to control movements of the valve member. An air-tight chamber is partitioned by the diaphragm and filled with heat-sensitive gas, and mounted on the valve shell to detect the temperature of gaseous-phase refrigerant. A plug member shuts an outer wall opening provided in an outer wall of the pressure-operating housing after heat-sensitive gas is fully introduced into the air-tight chamber through the outer wall opening.

In the conventional thermostatic expansion valve above, the plug member, which has a flange portion, is typically fixed to the housing outer wall in such a manner that a portion of the spherical surf ace of the plug member is in direct contact with the opening edge of the housing outer wall and is secured thereto by projection welding. The flange portion of the plug member 16 is fixed to the housing outer wall by a solder-welding portion to seal the opening. In this method, the projection welding is used only for provisional fixture of the plug member, and the seal of the opening is established by the soldering.

SUMMARY OF THE INVENTION

In the conventional thermostatic expansion valve above, the projection welding used often fails to make an alloy along the entire circumference of the opening and causes an insufficient strength. Moreover, the solder often fails to extend to the projection welding portion, which makes a hollow space between the projection welding portion and the solder-welding portion and causes internal corrosion due to residual flux.

It is therefore an object of the invention to provide a thermostatic expansion valve in which the seal of an opening in a housing outer wall by a plug member can reliably established only by projection welding and free from corrosion of the housing outer wall around the projection welding.

According to the invention, there is provided a thermostatic expansion valve comprising: a valve shell defining a high-pressure refrigerant passage through which liquid refrigerant to be reduced in pressure travels, and a low-pressure refrigerant passage through which gaseous-phase refrigerant travels, the high-pressure refrigerant passage including a valve hole midway thereof; a valve member moved to and away from the valve hole in the valve shell to change the opening rate of the valve hole; a pressure-operating housing containing a diaphragm for driving the valve member to control movements of the valve member, the diaphragm dividing the interior of the housing into an air-tight chamber filled with heat-sensitive gas and an equalizing chamber communicating with the low-pressure refrigerant passage, the pressure-operating housing being attached to the valve shell to detect the temperature of the gaseous-phase refrigerant; and a plug member sealing an opening made in an outer wall of the pressure-operating housing after heat-sensitive gas is introduced to fill the air-tight chamber, in which the plug member may be fixed to a tapered peripheral edge of the housing outer wall by projection welding at the contact with the peripheral edge 14a of the opening. An anticorrosive material may be applied to watertightly seal the portion around the projection welding portion.

BRIEF DESCRIPTION OF THE DRAWINGS

FIG. 1 is a central, longitudinal, cross-sectional view of a thermostatic expansion valve according to a first embodiment of the invention;

FIG. 2 is a fragmentary, enlarged, cross-sectional view showing a cavity defined on a modified thermostatic expansion valve with an elongated projection welding portion;

DETAILED DESCRIPTION OF PREFERRED EMBODIMENT

Figure 3:
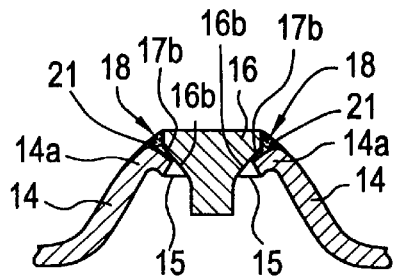
FIG. 3 is a fragmentary, cross-sectional view of a thermostatic expansion valve according to a second embodiment of the invention.

A first embodiment of the invention is explained below in detail with reference to FIGS. 1 and 2.

In FIGS. 1 and 2, reference numeral 1 denotes a shell of a thermostatic expansion valve to be located in a refrigerating cycle of a car air conditioner. The shell defines a high-pressure refrigerant passage 2 through which liquid refrigerant to be reduced in pressure travels, and a low-pressure refrigerant passage 3 through which gaseous-phase refrigerant travels. The high-pressure refrigerant passage 2 includes a valve hole 4 in the form of a small-diameter throttle hole midway thereof. Therefore, liquid refrigerant introduced into the high-pressure refrigerant passage 2 is adiabatically expanded when running through the valve hole 4 having a small passage area.

The inlet portion of the valve hole 4, from which the refrigerant enter the valve hole 4, defines a valve seat which permits a ball-shaped valve member 5 tightly fits to or move away from it. The valve member 5 is supported by a ball carrier 7, and biased to the shutting direction (the direction for pressing the valve member 5 to the valve seat of the valve hole 4) by a compression coil spring 9 interposed between the ball carrier 7 and an adjusting nut 8.

Numeral 10 denotes a pressure-operating housing mounted on the upper end of the valve shell 1 to detect the temperature of gaseous-phase refrigerant. The pressure-operating housing 10 includes a diaphragm 11 for driving the valve member 5 through a driving rod 6, an air-tight chamber 12 to be filled with heat-sensitive gas, and an equalizing chamber 13 partitioned from the air-tight chamber 12 by the diaphragm and communicating with the low-pressure refrigerant passage 3.

The housing 10 includes an outer wall 14 having an opening 15 which is sealed by a metallic plug member 16 after a gas-filled state of the air-tight chamber 12 is established by introducing heat-sensitive gas through the opening 15.

Therefore, the air-tight chamber 12 detects the temperature of the gaseous-phase refrigerant which flows through the low-pressure refrigerant passage 3, and varies in pressure with changes in temperature of the gaseous-phase refrigerant. On the other hand, since the equalizing chamber 13 located downstream of the diaphragm 11 and communicating with the low-pressure refrigerant passage 3 exhibits the same pressure as that of the gaseous-phase refrigerant flowing in the low-pressure refrigerant passage 3. Therefore, the diaphragm 11 is moved by the difference between the air-tight chamber 12 and the equalizing chamber 13, and transfer the movement to the valve member 5 through the driving rod 6 to control the opening rate of the valve hole 4.

As shown in the enlarged fragmental portion of FIG. 1 in FIG. 2, the plug member 16 includes a projection 16a to be inserted in the opening 15 of the housing outer wall 14, and a conical portion 16b having a funnel-shaped lateral surface that extends with an angle of about 90 degrees to 120 degrees and contacts proximity to the peripheral edge 14a of the housing outer wall 14 at the opening 15. The peripheral edge 14a is also funnel-shaped so as to slope down with a tapering angle of about 120 degrees toward the center of the opening 15. These tapered contact portions of the conical portion 16b and the peripheral edge 14a of the opening 15 of the housing outer wall 14 are joined by projection welding over the length of 0.2 mm to 1.5 mm. As a result, the opening 15 of the housing outer wall 14 is sealed by the projection welding alone and maintains the gas-filled status of the air-tight chamber 12.

In this status, a cavity 18 exists around the projection welding portion 17 on the housing outer wall 14 as shown in FIGS. 1 and 2, and unless removed, it will cause corrosion of the housing outer wall 14. In the present invention, an anti-corrosive material 21, such as adhesive or the like, may be applied to the cavity to remove space around the welding portion of the plug member 16 such that water cannot enter or remain there. In FIG. 1, a compressor 30 is connected to the outlet of the low-pressure refrigerant passage 3 and to a condenser 31. The condenser 31 is connected to a reservoir 32, which is connected to the high-pressure refrigerant passage 2. The high-pressure refrigerant passage 2 is connected to an evaporator 33 which, is connected to the inlet of the low-pressure refrigerant passage 3.

Enclosure of heat-sensitive gas within the air-tight chamber 12 in the housing 10 is performed by the method explained below. That is, the pressure-operating housing 10 including the driving rod 6 and the diaphragm 11 is sandwiched and fixed between a metallic lower block and a non-metallic upper block such that the opening 15 opens upward. Then the interior space of the upper block is evacuated to establish a nearly vacuum state in the air-tight chamber 12, and heat-sensitive gas is introduced to fill the air-tight chamber 12.

After that, a movable plunger in the upper block is pressed down to introduce the plug member 16 held by the plunger into the opening 15 until the conical portion 16b of the plug member 16 contacts with the peripheral edge of the opening in the housing outer wall 14. In this state, a voltage for projection welding is applied to the plunger and the lower block. As a result, the plug member 16 is fixed to the housing outer wall 14 by projection welding at their direct contact while keeping the gas-filled status of the air-tight chamber 12.

FIG. 3 shows a second embodiment of the invention. In this embodiment, the housing outer wall 14 includes a planar surface around the opening 15, and the taper angle of the conical portion 16b of the plug member 16 ranges from 90 degrees to 130 degrees. The conical portion 16b of the plug member 16 is fixed to proximity to the peripheral edge 14a of the outer wall 14 at the opening 15 by projection welding at the edge contact portion 17b, and an anti-corrosive material 21 may be applied to fill the cavity 18 made around the projection welding 17b. Thus the portion around the welding portion is configured to prevent water from residing there.

Figure 4:
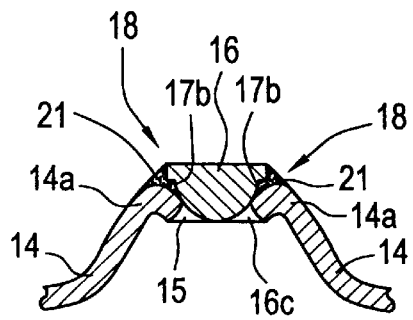
FIG. 4 is a fragmentary, cross-sectional view of a thermostatic expansion valve according to a third embodiment of the invention.

FIG. 4 shows a third embodiment of the invention. In this embodiment, the housing outer wall 14 includes a tapered surface around the opening 15. The spherical surface 16c of the plug member 16 is fixed to proximity to the peripheral edge 14a of the outer wall 14 at the opening 15 by projection welding at the contact portion 17b, and an anti-corrosive material 21 may be applied to fill the cavity 18 made around the projection welding 17b. Thus the portion around the welding portion is configured to prevent water from residing there.

Figure 5:
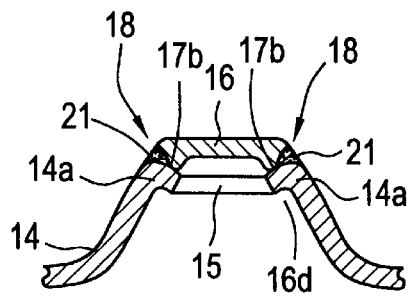
FIG. 5 is a fragmentary, cross-sectional view of a thermostatic expansion valve according to a fourth embodiment of the invention.

FIG. 5 shows a fourth embodiment of the invention. In this embodiment, the housing outer wall 14 includes a peripheral edge 14a having a tapered surface around the opening 15. An edge portion 16d of the plug member 16 is fixed to the tapered surface of the peripheral edge 14a around the opening 15 of the housing outer wall 14 at an edge contact portion 17b by projection welding. Then an anti-corrosive material 21 may be applied to the cavity 18 made around the welding portion. Thus the portion around the welding portion is configured to prevent water from residing there.

Figure 6:
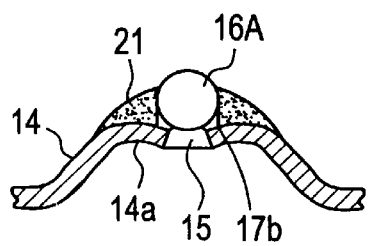
FIG. 6 is a fragmentary, cross-sectional view of a thermostatic expansion valve according to a fifth embodiment of the invention.

FIG. 6 shows a fifth embodiment of the invention. In this embodiment, a ball-shaped plug member 16A, made of steel or stainless steel, is used and fixed to the housing wall 14 at the edge contact portion 17b by projection welding. A peripheral edge 14a of the housing outer wall 14 around the opening 15 may be tapered or arcuate as shown in FIG. 6 to fittingly receive the ball 16A. An anti-corrosive material 21 may be applied to water-tightly protect the 8 welding portion 17b.

As described above, all thermostatic expansion valves according to the invention are made by fixing the plug member to the peripheral edge of the opening of the housing outer wall at the direct contact portion therewith by projection welding. The peripheral edge of the opening may be tapered for easy fitting of a plug member to cover the opening. An anti-corrosive material may be applied to fill a cavity made around the welding portion. Then, the seal of the opening in the housing outer wall by the plug member can be reliably established only by projection welding. At the same time, it can be prevented that water resides around the projection welding portion on the housing outer wall, and corrosion of the outer wall around the welding portion of the plug member can be reliably prevented.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The entire disclosures of Japanese Patent Applications, No. 6-320742 filed Dec. 22, 1994, 7-166001 filed Jun. 30, 1995 and No. 8-246513 filed Sep. 18, 1996, including specifications, drawings and claims, are herein incorporated by reference in their entirety.

What is claimed is:

1. A thermostatic expansion valve comprising:

a valve shell having a high-pressure refrigerant passage through which a liquid-phase refrigerant to be decompressed travels, and a low-pressure refrigerant passage through which gaseous-phase refrigerant travels, said high-pressure refrigerant passage having a valve hole;

a valve member movable to and away from said valve hole to change the opening rate of said valve hole;

a valve rod with one end that contacts the valve member;

a pressure-operating housing containing a diaphragm that drives said valve member via said valve rod to open and close said valve member, said diaphragm dividing the interior of said housing into an air-tight chamber filled with a heat-sensitive gas and an equalizing chamber communicating with said low-pressure refrigerant passage, said pressure-operating housing being attached to said valve shell to detect the temperature of said gaseous-phase refrigerant, wherein said air-tight chamber has an opening through an outer wall of said pressure-operating housing, said opening having a peripheral edge; and a plug member seated on the peripheral edge of said opening and welded to the opening peripheral edge solely by projection welding, so as to maintain the heat-sensitive gas-filled status of the air-tight chamber, wherein an anti-corrosive material is applied around the welding, which material occupies a cavity formed between the outer wall of the housing and the plug member and the projection welding to water-tightly seal said cavity.

2. The thermostatic expansion valve according to claim 1, wherein said plug member has a spherical surface that rests on said opening peripheral edge.

3. The thermostatic expansion valve according to claim 2, wherein said spherical surface is defined by a metallic ball.

4. The thermostatic expansion valve according to claim 1, wherein said plug member has a conical surface that rests on said opening peripheral edge.

* * * * *